(12) United States Patent
Stickels

(10) Patent No.: US 10,246,179 B2
(45) Date of Patent: Apr. 2, 2019

(54) DISPLAY SYSTEM

(71) Applicant: AGUSTAWESTLAND LIMITED, Somerset (GB)

(72) Inventor: Keith David Stickels, Somerset (GB)

(73) Assignee: AUGUSTAWESTLAND LIMITED, Somerset (GB)

( * ) Notice: Subject to any disclaimer, the term of this patent is extended or adjusted under 35 U.S.C. 154(b) by 0 days.

(21) Appl. No.: 14/148,816

(22) Filed: Jan. 7, 2014

(65) Prior Publication Data

US 2014/0365038 A1 Dec. 11, 2014

Related U.S. Application Data

(60) Continuation of application No. 13/867,581, filed on Apr. 22, 2013, now abandoned, which is a continuation of application No. 13/606,801, filed on Sep. 7, 2012, now abandoned, which is a continuation of application No. 13/354,526, filed on Jan. 20, 2012, now abandoned, which is a division of application (Continued)

(30) Foreign Application Priority Data

Jun. 25, 2003 (GB) .................................. 0314760.0

(51) Int. Cl.
| | | |
|---|---|---|
| G09B 9/02 | (2006.01) |
| B64C 19/00 | (2006.01) |
| B64C 13/02 | (2006.01) |
| B64C 27/56 | (2006.01) |
| B64D 43/00 | (2006.01) |
| G06F 3/0488 | (2013.01) |
| G05D 1/00 | (2006.01) |
| G06F 3/041 | (2006.01) |
| B64F 5/60 | (2017.01) |

(52) U.S. Cl.
CPC .............. *B64C 19/00* (2013.01); *B64C 13/02* (2013.01); *B64C 27/56* (2013.01); *B64D 43/00* (2013.01); *B64F 5/60* (2017.01); *G05D 1/00* (2013.01); *G06F 3/0412* (2013.01); *G06F 3/0488* (2013.01); *G06F 2203/04104* (2013.01)

(58) Field of Classification Search
USPC ...................................................... 434/28–59
See application file for complete search history.

(56) References Cited

U.S. PATENT DOCUMENTS 4,343,037 A * 8/1982 Bolton .......................... 345/582
5,286,202 A * 2/1994 de Gyarfas et al. ............ 434/43
(Continued)

*Primary Examiner* — Kesha Frisby
(74) *Attorney, Agent, or Firm* — B. Aaron Schulman; Stites & Harbison PLLC

(57) ABSTRACT

A display system for displaying a layout of controls in a simulator including at least one of an information display, a switch such as a toggle or push-button switch, and a monitoring device such as an indicator, or a gauge, for a vehicle, the display system including a touch sensitive screen which is generally transparent over a significant portion of its area, and a plurality of projectors which project onto a back of the screen, images of the vehicle controls, the projectors each being operatively connected to a computer controller which responds to the front of the screen being touched where a depicted control is displayed, to change the display in a manner to mimic the result of a corresponding actual vehicle control being operated.

6 Claims, 2 Drawing Sheets

Related U.S. Application Data

No. 12/192,301, filed on Aug. 15, 2008, now abandoned, which is a division of application No. 10/854,744, filed on May 27, 2004, now abandoned.

(56) References Cited

U.S. PATENT DOCUMENTS

2003/0054324 A1* 3/2003 Fountain .................. 434/37
2004/0162648 A1* 8/2004 Bontrager et al. ............ 701/3

* cited by examiner

DISPLAY SYSTEM

CROSS REFERENCE TO RELATED APPLICATIONS

This application is a continuation of application Ser. No. 13/867,581 filed Apr. 22, 2013, now abandoned, which is a continuation of application Ser. No. 13/606,801 filed Sep. 7, 2012, now abandoned, which is a continuation of application Ser. No. 13/354,526 filed Jan. 20, 2012, now abandoned, which is a divisional of application Ser. No. 12/192,301 filed Aug. 15, 2008, now abandoned; which is a divisional of application Ser. No. 10/854,744, filed May 27, 2004, now abandoned (which are hereby incorporated by reference).

BACKGROUND OF THE INVENTION

This invention relates to a display system which may be used as an aid in designing a layout of controls for a vehicle, and to the use of such a display system as a control apparatus for a vehicle.

The invention has particularly but not exclusively been derived as an aid in designing an instrument panel layout for an aircraft, although the invention may be applied to aid the designing the layout of other vehicles' controls. Thus the controls may include one or more information displays, switches and monitoring devices such as indicators and gauges.

DESCRIPTION OF THE PRIOR ART

It is conventional practice when designing an instrument panel layout for an aircraft, to design a general layout, and to make a model of the instrument panel design for testing purposes, to determine whether the controls have been placed on the instrument panel in convenient positions for a pilot, with regard both to ease of operation, and vision. It will be appreciated that different aircraft purchasers may have different requirements and thus in some instances, it is necessary not only to re-design the instrument panel layout and re-model the layout to suit the requirements of one customer, but to repeat the exercise to satisfy the requirements of different customers.

For example, where the aircraft is a helicopter for military use, the control layout may include military specific controls, such as a targeting display, whereas the same helicopter for civil use, would not require such a control.

SUMMARY OF THE INVENTION

According to a first aspect of the invention we provide a display system for displaying a layout of controls including at least one of an information display, a switch, and a monitoring device, for a vehicle, the display system including a touch sensitive screen which is generally transparent over a significant portion of its area, and a plurality of projectors which project onto a back of the screen, images of vehicle controls, the projectors each being operatively connected to a computer controller which responds to the front of the screen being touched where a depicted control is displayed, to change the display in a manner to mimic the result of a corresponding actual vehicle control being operated.

Thus utilizing a display system in accordance with the invention, the layout of controls may be changed straightforwardly by operating the computer controller, and by displaying the control layout on a touch sensitive screen, a test pilot or other vehicle operator, can realize a true appreciation of the control layout during testing, before or instead of needing to build a model control layout.

Because a plurality of projectors are used to display the images of controls on the back of the screen, the display screen may be of generally the same large size, and preferably the same shape as the depicted control layout, whilst achieving a good quality display. For example, where the controls are to be provided on an instrument panel, the display screen may mimic the instrument panel shape. In this way, the displayed layout of controls can most closely approximate to an actual proposed layout, and thus give the true appreciation of the control layout.

Where the controls depicted include an information display, such as for example an artificial horizon or a gauge such as an altitude gauge, the image displayed is preferably dynamic image rather than being a mere static image, again to provide a displayed control layout which approximates most closely to an actual control layout when a vehicle is in use.

However, in accordance with the invention, the nature of the dynamic image may be changed by touching the screen in a position where a control is depicted, which in an actual vehicle, when the control is operated, would change the information displayed.

The computer controller may receive at least one input from a modeled analogue control, which input results in a displayed control image being changed. For example, the display system may be a part of a modeled aircraft cockpit or other vehicle operator control position, which may include the modeled analogue control, and when the modeled analogue control is operated, for example a joystick or the like is moved, this may result in a change in the display analogous to the manner in which the display may change upon a corresponding control in an actual vehicle being operated.

Thus the display system may be used not only to aid the designing of a control layout, but also to train pilots/other vehicle operators, with a displayed control layout analogous to the actual control layout of the aircraft or other vehicle the operator is to operate.

The use of touch sensitive screens for example for controlling displays, is well established. However particularly in an aircraft, the use of touch sensitive controls has not hithertofore been acceptable, because pilots are familiar with and have greater trust in physical controls. However the present invention lends itself to use as an acceptable control apparatus because actual physical controls are depicted by the images, so that a pilot can enjoy the look and feel of a conventional physical control layout.

According to a second aspect of the invention we provide a control apparatus for a vehicle, the vehicle including a plurality of controllable actuators, the control apparatus including a display system for displaying a layout of controls including at least one of an information display, a switch, and a monitoring device, the display system including a touch sensitive screen which is generally transparent over a significant portion of its area, the display being controllable by a computer controller which responds to the front of the screen being touched where a depicted control is displayed, to provide a signal which is used to operate a vehicle actuator.

It will be appreciated that particularly where the display includes an information display, the display may change in response to vehicle parameters changing, and thus the computer controller of the display system may receive one or more inputs from sensors and the like which are responsive to changing vehicle parameters.

Because the control layout displayed is virtual, rather than physical, it will be appreciated than the control layout displayed may be tailored to a particular vehicle controller's requirements. For example one pilot may prefer a particular control in one position, and another pilot may prefer that control in an alternative position. In accordance with the invention, the display system may be adapted to display the images of the controls in different positions for different vehicle operators, for example only, by the computer controller recognizing e.g. by login or password on vehicle or display system start-up, the identity of a particularly controller who will control the vehicle.

According to a third aspect of the invention, we provide a vehicle including a control apparatus according to the second aspect of the invention. The vehicle may be an aircraft, such as a helicopter.

According to a fourth aspect of the invention we provide a method of controlling a vehicle in which the vehicle includes a plurality of actuators to be controlled, and a display system for displaying a layout of controls including at least one of an information display, a switch, and a monitoring device, the display system including a touch sensitive screen which is generally transparent over a significant portion of its area, the display being controlled by a computer controller which responds to the front of the screen being touched where a depicted control is displayed, to provide a signal which is used to operate a vehicle actuator, the method including identifying a controller who is to operate the vehicle, and displaying the images of the controls in positions depending upon the identity of the vehicle operator.

BRIEF DESCRIPTION OF THE DRAWING

Embodiments of the invention will now be described with reference to the accompanying drawings in which.

DESCRIPTION OF THE PREFERRED EMBODIMENT

Figure 1:
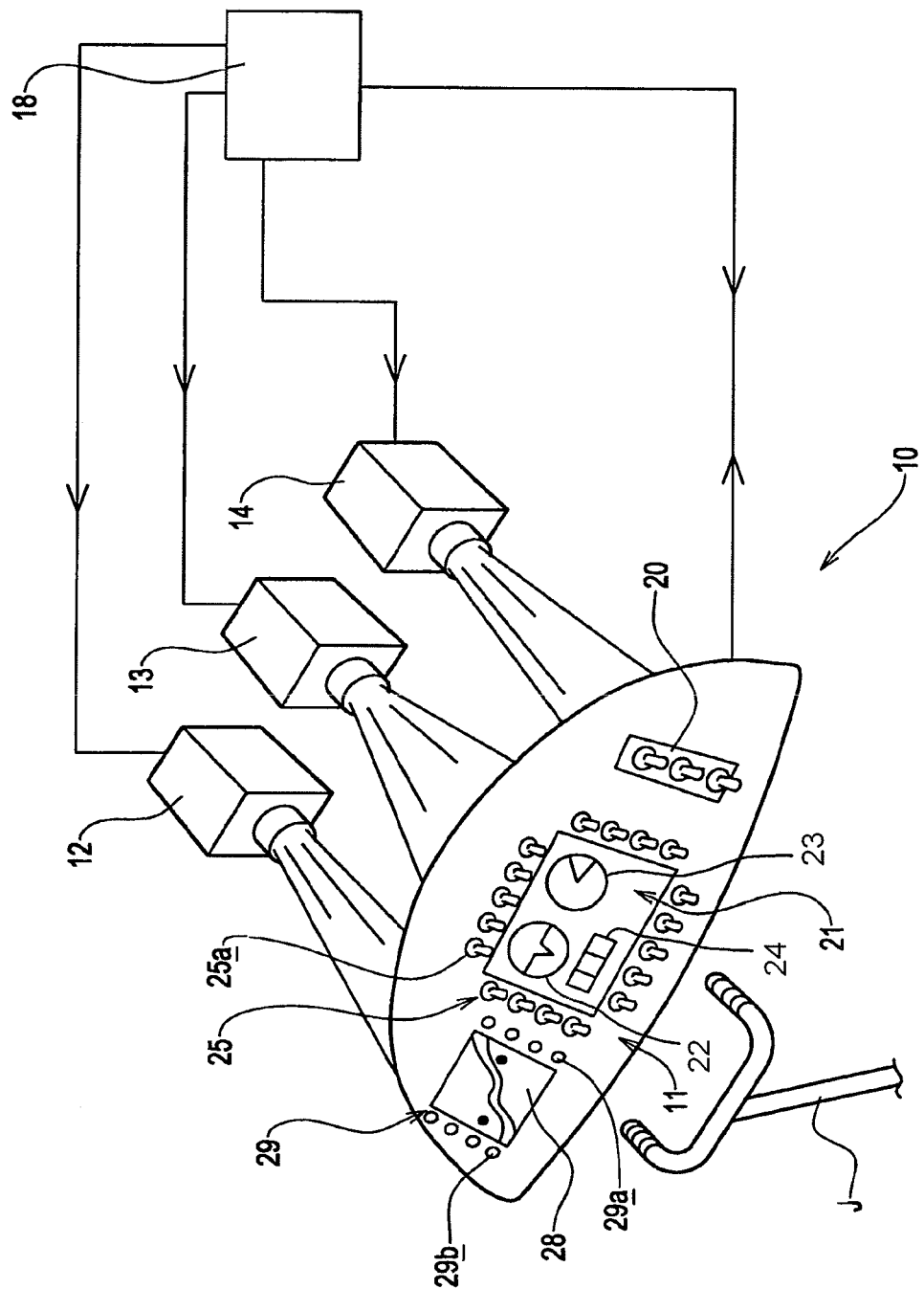
FIG. 1 is an illustrative perspective view of a display system in accordance with the invention.

Referring to FIG. 1 of the drawings, there is shown a display system 10 which includes a touch sensitive screen 11, and a plurality, in this example three, projectors 12, 13, 14, the projectors 12, 13, 14 each being operatively connected by a hard wire link, a network or wireless connection, to a computer control 18, which may include one or a plurality of processing units.

The projectors 12, 13, 14 project onto a back of the touch screen 11, images of various controls including a bank of toggle switches 20, a first information display 21 which includes an artificial horizon indicator 22, various monitoring devices namely an altitude gauge 23, and a bank of three indicator lights 24. The first information display 21 is surrounded by banks of toggle switches 25.

A second information display 28 is a map giving a virtual depiction of a terrain on which or over which a vehicle may be travelling. The second information display 28 is surrounded by images of banks of push-button switches 29.

The display screen 11 is generally transparent, at least over an area where images of controls are to be displayed, and thus the images may be viewed from the front of the screen 11, from where the projectors 12, 13, 14 at least, may be hidden, This embodiment of the invention shown in the drawings is for use in aiding the design of a control layout of an instrument panel in an aircraft cockpit. Accordingly, the images of the controls displayed, all relate to aircraft controls, by which term we include each of the information displays 21, 28, the various switches 25 and 29, indicators 22, 24, and gauges 23. The particular layout is purely exemplary and may readily be changed as required, as will become apparent from the description below. Thus the instrument panel may feature other kinds of controls, such as rotary switches, sliders and indeed any other desired control, switch or monitoring device.

The display screen 11 is of approximately the same size and shape as the actual instrument panel in the aircraft, and where an information display 21, 28, and indicator 22, 24 or gauge 23, or the like would in actual aircraft use, dynamically change, the display may change appropriately so that the display of controls gives a truer "look and feel." of an actual control layout in an aircraft cockpit.

For example, the artificial horizon indicator 22 may slowly move to give an impression of a flying aircraft; the altimeter gauge 23 may change to show varying altitude as would be experienced in flight; the indicator lights 24 may be on or off to depict different aircraft operating conditions, and the second information display 28 may give the impression of the aircraft flying over the terrain depicted.

If the touch screen 11 is touched where a control is depicted, for example if the screen 11 is touched where the toggle switch 25a is depicted, the screen 11 provides an input to the computer control 11 which responds by changing the display of the switch 25a. Thus as shown in the drawing the switch 25a is in a "down" position; by touching the screen 11 on the switch image 25a, the computer control 18 may change the display to show the switch 25a in its alternative toggled "up" position.

Similarly if the screen 11 is touched where the push-button switches 29 are displayed, e.g. where push-button switch 29a is depicted, the computer control 18 may change the display to correspond to that switch 29a being operated in an actual control layout of the aircraft e.g. to show the switch 29a depressed, and for example to change the view of magnification of the map displayed by the second information display 28.

The display system 11 may be used in conjunction with modeled analogue controls, such as a joystick J which may provide an input to the computer controller 18, and the displayed control layout may thus be changed by the computer controller 18, in response to modeled analogue control movements too. For example, on moving a joystick back, the altitude gauge 23 may suggest a climbing maneuver. Thus the display system 10 may simulate an actual control layout.

In accordance with the first aspect of the invention, when designing a control layout, in order to try out a particular design, the touch screen 11 may be touched to simulate operating controls, and any modeled analogue controls may be operated by a test pilot. In the event that it is desired to change the control layout, for one example only to exchange the positions of the altitude gauge 23 and the artificial horizon 22, this may be achieved by simple re-programming of the computer controller 18 through a suitable software interface, without the need physically to re-model an actual model of the instrument panel.

As well as being useable as a design tool, the display system 10 may be used as part of an aircraft simulator system. Thus particular where a plurality of aircraft cockpit control layouts are in use, for example for different models of aircraft, e.g. for a military appointed aircraft and a civilian appointed aircraft, a pilot may be trained on a simulator with an appropriate control layout for the aircraft the pilot will be flying, simply by selecting an appropriate control layout to be displayed on the screen 11.

Figure 2:
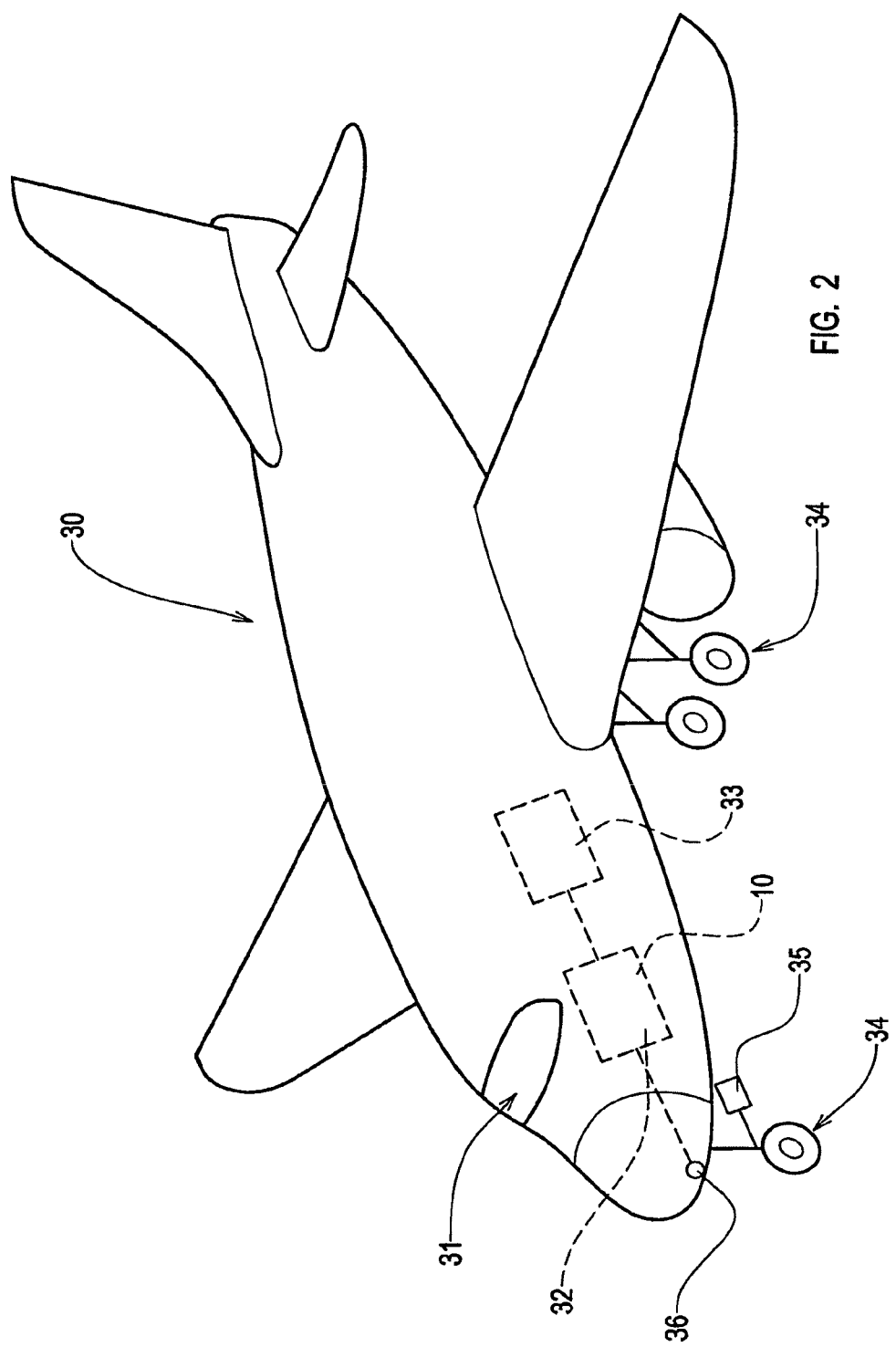
FIG. 2 is an illustrative view of an aircraft with a display system according to the invention.

In accordance with the fourth aspect of the invention, the display system 10 may be used in an actual aircraft environment as a control apparatus as illustrated in FIG. 2. In FIG. 2 there is shown an aircraft 30 having a cockpit 31 in which the control apparatus 32 may be provided. Thus instead of actual controls, images of controls may be displayed. In this case, touching of the screen 11 where a control is depicted, will signal the computer controller 18 not only to change the control layout displayed, but also to generate a signal which is used by and aircraft control system 33 to operate one or more control actuators. Thus for example only, touching the display screen 11 where the push-button control 29b is depicted, could result in landing gear 34 of the aircraft being lowered by one or more landing gear actuators 35. An aircraft control system 33 will include sensors 36 to sense the condition of operating parts of the aircraft, and thus for example, upon a sensor 36 indicating that the actuator 35 has lowered the landing gear 34 fully, the sensor 36 may signal the control system 33 which in turn signals the computer controller 18 of the display 10, for example to change the display to depict one of the indicator lights 24 in a lit-up condition.

Of course, because the control layout displayed is virtual, the control layout displayed may be tailored to the requirements of a particular pilot. Thus upon aircraft 30 start-up, or at least start-up of the display system 10, the pilot may identify himself to the computer controller 18, for example by login, password or even a physical identifier such as a smart card, and as a result the computer controller 18 may display the various controls in positions on the screen 11 according to a particular pilot's preferences.

In the example, three projectors 12, 13, 14 are provided, each of which projects an image of part of the control layout only onto the back of the screen 11. In another example, more or less projectors may be provided as appropriate to the nature of the control layout to be displayed.

Although the invention has been described in relation to a control layout for an aircraft, the invention may be applied to display control layouts for other vehicles, in which case references to the pilot in this description should be construed as including other vehicle operators.

It will be appreciated that in the example, the control layout is displayed on a screen 11 which is instrument panel sized and shaped. Obviously for a control layout, for example depicting a control layout on a roof or otherwise mounted instrument panel, the display screen is preferably configured to the shape of the particular instrument panel depicted.

In another embodiment, where the display system 10 is for use in a control apparatus, the control images may be displayed other than by projectors 12, 13, 14. For example, the screen 11 may be a solid state screen. Any known or to be developed touch screen technology may be employed to signal the computer controller 18, when the screen 11 is touched.

Various other modifications may be made without departing from the scope of the invention as will be apparent to those skilled in the art.

I claim:

1. A control apparatus for a vehicle, the vehicle being an actual, non-simulated vehicle and including a plurality of controllable actuators, the control apparatus comprising:
   a display system for displaying a layout of controls including at least one of an information display, a switch, and a monitoring device, the display system including a touch sensitive screen; and
   a computer controller which controls the display system and which responds to a front of the screen being touched where a depicted control is displayed to provide a signal which is used to operate a controllable actuator of the plurality of controllable actuators of the non-simulated vehicle;
   wherein the display system displays images of the controls in different positions for different vehicle operators, and wherein the computer controller recognizes an identity of a particular operator who will control the non-simulated vehicle.

2. A control apparatus according to claim 1 wherein the computer controller of the display system in use, receives one or more inputs from sensors which are responsive to changing vehicle parameters, the display including an information display which changes in response to vehicle parameters changing.

3. A control apparatus as claimed in claim 1, wherein the display system includes a plurality of projectors which project, onto a back of the screen, the images of the controls, the projectors each being operatively connected to the computer controller which responds to the front of the screen being touched where a depicted control is displayed, to change the display in a manner that mimics a result of a corresponding physical vehicle control being operated.

4. An actual, non-simulated vehicle, comprising:
   a plurality of controllable actuators; and
   a control apparatus for the controllable actuators, the control apparatus including a display system for displaying a layout of controls including at least one of an information display, a switch, and a monitoring device, the display system including a touch sensitive screen, a computer controller which controls the display system and which responds to a front of the screen being touched where a depicted control is displayed to provide a signal which is used to operate a controllable actuator of the plurality of controllable actuators of the non-simulated vehicle,
   wherein the display system displays images of the controls in different positions for different vehicle operators, and wherein the computer controller recognizes an identity of a particular operator who will control the non-simulated vehicle.

5. A vehicle according to claim 4, wherein the vehicle is an aircraft and wherein the controllable actuators are aircraft controllable actuators.

6. A method of controlling a vehicle in which the vehicle is an actual, non-simulated vehicle and includes a plurality of controllable actuators to be controlled, the method comprising:
   displaying a layout of controls, including at least one of an information display, a switch, and a monitoring device, on a touch sensitive screen;
   controlling of the displayed layout with a computer controller which responds to a front of the screen being touched where a depicted control is displayed to provide a signal which is used to operate a controllable actuator of the plurality of controllable actuators of the non-simulated vehicle;

identifying a controller who is to operate the non-simulated vehicle; and displaying images of the controls within the layout of the controls in positions on the screen depending upon an identity of the vehicle controller.

\* \* \* \* \*